(12) United States Patent
Illgner-Fehns et al.

(10) Patent No.: US 11,290,788 B2
(45) Date of Patent: Mar. 29, 2022

(54) TRANSMISSION APPARATUS FOR WIRELESS TRANSMISSION ON AN MPEG-TS (TRANSPORT STREAM) COMPATIBLE DATA STREAM

(71) Applicant: INSTITUT FUR RUNDFUNKTECHNIK GMBH, Munich (DE)

(72) Inventors: Klaus Michael Illgner-Fehns, Starnberg (DE); Clemens Kunert, Unterfoehring (DE); Hermann Lipfert, Oberhaching (DE); Swen Petersen, Munich (DE); Ahmad El Malek, Munich (DE); Willem Leonardus Van Der Kruk, Veldhoven (NL)

(73) Assignee: Institut Fur Rundfunktechnik GMBH, Munich (DE)

( * ) Notice: Subject to any disclaimer, the term of this patent is extended or adjusted under 35 U.S.C. 154(b) by 92 days.

(21) Appl. No.: 16/098,356

(22) PCT Filed: May 2, 2017

(86) PCT No.: PCT/EP2017/060428
§ 371 (c)(1),
(2) Date: Nov. 1, 2018

(87) PCT Pub. No.: WO2017/191136
PCT Pub. Date: Nov. 9, 2017

(65) Prior Publication Data
US 2019/0149891 A1 May 16, 2019

(30) Foreign Application Priority Data

May 3, 2016 (IT) .......................... UA2016A003095

(51) Int. Cl.
*H04N 21/6437* (2011.01)
*H04N 21/222* (2011.01)
(Continued)

(52) U.S. Cl.
CPC ....... *H04N 21/6437* (2013.01); *H04N 21/222* (2013.01); *H04N 21/438* (2013.01);
(Continued)

(58) Field of Classification Search
CPC ....... H04N 21/43637; H04N 21/26216; H04N 21/2385; H04N 21/6437; H04N 21/222;
(Continued)

(56) References Cited

U.S. PATENT DOCUMENTS 8,456,532 B1 6/2013 Petkevich et al.
2012/0011550 A1* 1/2012 Holland ................ H04N 21/40
725/78

(Continued)

FOREIGN PATENT DOCUMENTS

EP 1 553 735 A1 7/2005
WO 2014/111407 A1 7/2014

OTHER PUBLICATIONS

*Wi-Fi Display Technical Specification*, Version 1.0.0, Wi-Fi Alliance Specification, Aug. 24, 2012 (Aug. 24, 2012), 149 pp, XP009172467.
(Continued)

*Primary Examiner* — Ngoc K Vu
(74) *Attorney, Agent, or Firm* — Workman Nydegger

(57) ABSTRACT

A transmission apparatus for wireless transmission of an MPEG-TS (Transport Stream) compatible data stream, according to the Wi-Fi Display Technical Specification of the Wi-Fi Alliance, e.g., in the Version 1.1.0 (Miracast) to a receiver apparatus. The transmission apparatus is provided with a terminal for receiving an MPEG-TS compatible data (Continued)

stream, and is further adapted to wirelessly transmit a first IP address characterizing the transmission apparatus to a receiver apparatus according to the Wi-Fi Display Technical Specification of the Wi-Fi Alliance, e.g., in the Version 1.1.0 (Miracast). The transmission apparatus is also adapted to combine the first IP address with the MPEG TS compatible data stream before wireless transmission to the receiver apparatus. The transmission apparatus is further adapted to allow the receiver apparatus to receive an external IP data stream from an external signal source, and is adapted to wirelessly transmit a second address to the receiver apparatus, the second address characterizing the external signal source. A receiver apparatus according to the Wi-Fi Display Technical Specification of the Wi-Fi Alliance, e.g., in the Version 1.1.0 (Miracast), is provided for receiving the external IP data stream.

6 Claims, 10 Drawing Sheets

(51) Int. Cl.
    *H04N 21/6332*     (2011.01)
    *H04N 21/438*     (2011.01)
    *H04N 21/61*     (2011.01)
    *H04N 21/643*     (2011.01)

(52) U.S. Cl.
    CPC ..... *H04N 21/6125* (2013.01); *H04N 21/6332* (2013.01); *H04N 21/643* (2013.01); *H04N 21/64322* (2013.01)

(58) Field of Classification Search
    CPC ............. H04N 21/438; H04N 21/6125; H04N 21/643; H04N 21/64322; H04N 21/6332; H04L 65/602; H04L 65/60; H04L 29/06; H04W 72/10
See application file for complete search history.

(56) References Cited

U.S. PATENT DOCUMENTS

| | | | |
|---|---|---|---|
| 2013/0227084 A1* | 8/2013 | Kim | ..................... H04W 8/005 709/219 |
| 2013/0282800 A1 | 10/2013 | Barrett et al. | |
| 2013/0346562 A1* | 12/2013 | Kim | ................... H04L 65/1083 709/219 |
| 2014/0334381 A1 | 11/2014 | Subramaniam et al. | |
| 2015/0023648 A1 | 1/2015 | Sheth et al. | |
| 2015/0036735 A1* | 2/2015 | Smadi | ................... H04L 65/605 375/240.02 |
| 2015/0095510 A1* | 4/2015 | Bhorkar | .............. H04L 12/2805 709/231 |
| 2015/0358676 A1 | 12/2015 | El Malek | |
| 2016/0188279 A1* | 6/2016 | Rajamani | ................. G09G 5/14 345/2.3 |
| 2016/0219606 A1* | 7/2016 | Amano | ............ H04N 21/26216 |
| 2017/0264359 A1* | 9/2017 | Bernsen | ................ G06F 1/1632 |
| 2018/0234978 A1* | 8/2018 | Shao | ..................... H04W 72/02 |
| 2018/0262801 A1* | 9/2018 | Park | ................... H04N 21/4122 |

OTHER PUBLICATIONS

International Search Report dated Jun. 6, 2017, issued in PCT Application No. PCT/EP2017/060428 filed May 2, 2017.
Written Opinion dated Jun. 6, 2017, issued in PCT Application No. PCT/EP2017/060428 filed May 2, 2017.
Anonymous, IPv4—*Wikipedia, the free encyclopedia*, retrieved from the internet: https://en.wikipedia.org/w/index.php?title=IPv4 &oldid=705921902, Feb. 20, 2016, XP055306048.

* cited by examiner

TRANSMISSION APPARATUS FOR WIRELESS TRANSMISSION ON AN MPEG-TS (TRANSPORT STREAM) COMPATIBLE DATA STREAM

INTRODUCTORY PART OF THE DESCRIPTION

1. Field of the Invention

The invention relates to a transmission apparatus and to a receiver apparatus. A transmission apparatus according to the preamble of claim 1 is known from the Wi-Fi Display Technical Specification, Version 1.1.0 of the Wi-Fi Alliance. This technical specification describes a wireless transmission system according to the so-called Miracast standard.

2. Present State of the Art

In the known transmission apparatus, a video and/or audio information signal is encoded into a Miracast-compatible data stream which is transmitted wirelessly. For this, the video and/or audio information signal is packed, after video or audio encoding, in an MPEG2-TS compatible data stream, once this MPEG2-TS compatible data stream has been transformed into a Miracast-compatible data stream, it can be transmitted wirelessly to a receiver, e.g., a Miracast-compatible television set.

DESCRIPTION OF THE INVENTION

The object of the invention is to propose an improved transmission apparatus and receiver apparatus. The invention is based on the inventive idea that Miracast is increasingly being used in-house for the distribution of streaming content (including broadcasting content) which is defined in the Wi-Fi Display Technical Specification of the Wi-Fi Alliance. Almost all new mobile (laptop, tablet and mobile phone) and stationary (TV, projector) terminals support this technology with the result that there is high market penetration. Miracast is currently defined such that a portable device, mainly tablet or mobile phone, transmits content to a television set. The content is thus generated or transcoded directly by the terminal. Transmission from other sources can therefore only be realised to a limited extent and with loss of quality (due to transcoding)—this is not always feasible or acceptable.

The current Miracast transmission method, however, is inflexible because only a limited number of video and/or audio format signals are accepted.

The measures according to the invention have the effect that the transmission apparatus according to the Miracast method is additionally able to transmit an external IP data stream wirelessly to a Miracast-compatible receiver apparatus so that the information already present as an external IP data stream can be transmitted to the receiver apparatus without transcoding.

In one embodiment, the transmission apparatus receives the external IP data stream and then transmits it to the receiver apparatus. In another embodiment according to the invention, the transmission apparatus transmits an external IP data stream 'directly' to the receiver apparatus and thus by bypassing the transmission apparatus. In this embodiment, the external IP data stream can be transmitted to the receiver apparatus via an Internet connection or WLAN connection.

In a further embodiment of the receiver apparatus, the received, wirelessly transmitted external IP data stream can be forwarded after reception 'directly' to an external decoding unit which further processes the external IP data stream into a specific information signal. It would also be possible, however, to first remove the received external IP data stream from the IP headers in an IP extraction unit of the receiver apparatus, and only then to forward it to an external decoding unit.

Depending on the signal processing which resulted in the external IP data stream, the data stream thus obtained can also be forwarded to an external decoding unit only after a further UDP extraction or RTP extraction. It is even possible, depending on the suitability of the external IP data stream, to supply the external IP data stream directly to the MPEG decoding unit present in the receiver apparatus after decapsulation in the IP extraction unit.

It should be mentioned that a transmission apparatus according to the Miracast standard is described in WO2014111407A, wherein only one video and/or audio information signal for wireless transmission by means of the Miracast transmission apparatus is derived from an MPEG2-TS compatible data stream with a plurality of video and/or audio information signals. It is not the intention to discuss here the transmission of an external IP data stream by means of a Miracast transmission apparatus and how this is to be implemented.

BRIEF DESCRIPTION OF THE FIGURES

The invention is explained in greater detail in the description of the figures below based on a few embodiments. The drawing shows FIG. 1 an embodiment of a transmission of an external IP data stream between an external IP source and a Miracast-compatible receiver apparatus, transmission being enabled by means of a Miracast-compatible transmission apparatus.

DETAILED DESCRIPTION OF THE FIGURES

Figure 1:
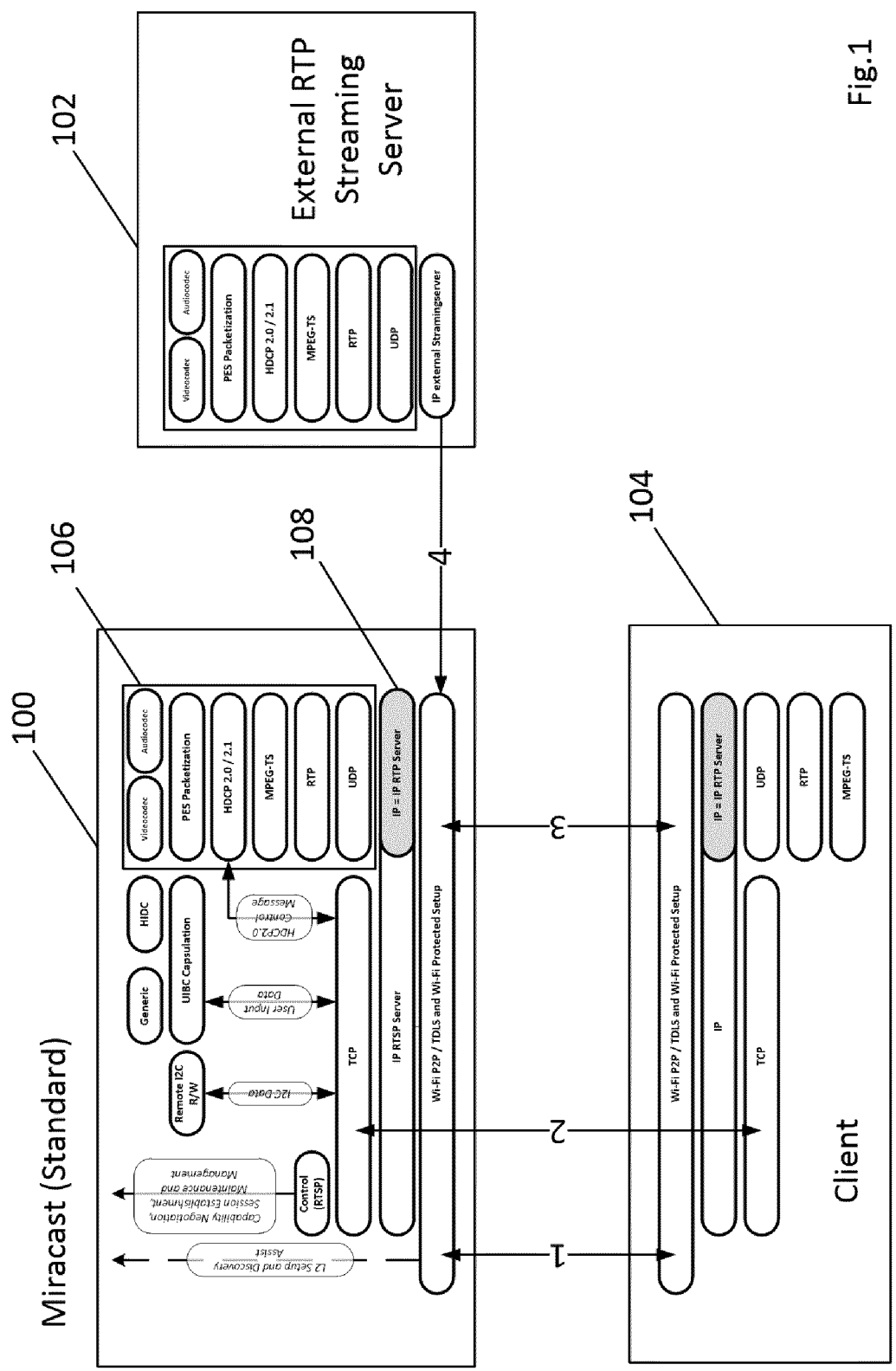

FIG. 1 shows, in a schematic manner, a transmission according to the invention of an external IP data stream between an external IP source 102 and a Miracast-compatible receiver apparatus 104, which enables transmission by means of a Miracast-compatible transmission apparatus 100. In this first embodiment, the external IP data stream is first received by the transmission apparatus 100 from the external IP source 102 and then wirelessly forwarded to the receiver apparatus 104.

The procedure is described below.

In the first step, a connection is established between the Miracast-compatible transmission apparatus 100 and the Miracast-compatible receiver apparatus 104. This is indicated by the arrow 1 in FIG. 1. This connection is initiated in the Miracast standard by means of the so-called 'Wi-Fi P2P' method.

In the second step, a 'session setup', as referred to in the Miracast standard, of the Wi-Fi display then takes place. This is indicated by the arrow 2 in FIG. 1.

In the Miracast transmission method according to the standard, a single A/V information signal is transformed by the signal processing block 106 in the transmission apparatus 100 into an MPEG-TS compatible transmission signal which is then transmitted wirelessly to the receiver apparatus 104 as an IP transmission signal. This is indicated by the arrow 3 in FIG. 1.

In detail, in the 'session setup' the transmission apparatus 100 generates a first IP address which characterises said transmission apparatus. This first IP address is transmitted in the session setup (arrow 2) to the receiver apparatus 104. In addition, the MPEG-TS compatible transmission signal is packed in IP blocks of the IP transmission signal (in the IP layer 108), that is together with the first IP address. The receiver apparatus 104 now receives the IP blocks with the first IP address via the wireless connection (arrow 3) to the transmission apparatus 100. The MPEG-TS compatible data stream is derived from this. The MPEG-TS compatible data stream is then converted into a screen signal so that it can be played back on a screen (not shown in FIG. 1).

According to the invention, if there is a need for a data stream in the receiver apparatus 104, which cannot be supplied by the transmission apparatus 100, the transmission apparatus 100 is able, e.g., by means of an Internet connection (not shown in FIG. 1), to search for a source which can supply this desired data stream. It finds the source 102 which supplies this desired data stream as an (external) IP data stream. This source 102 has its own address, which is defined here as a second address, and thus characterises this source 102. This second address can, for example, be an IP address or can also be set up, for example, as a URL. The transmission apparatus 100 determines this second address from the external IP source 102 and transmits it in a session setup step to the receiver apparatus 104 (arrow 2). Since the desired data stream is already present as an IP data stream, the transmission apparatus 100 receives this data stream "on the IP level", as indicated by the arrow 4 in FIG. 1, and transmits this external IP data stream wirelessly to the receiver apparatus via the wireless connection between the transmission apparatus 100 and the receiver apparatus 104 (arrow 3).

Figure 2:
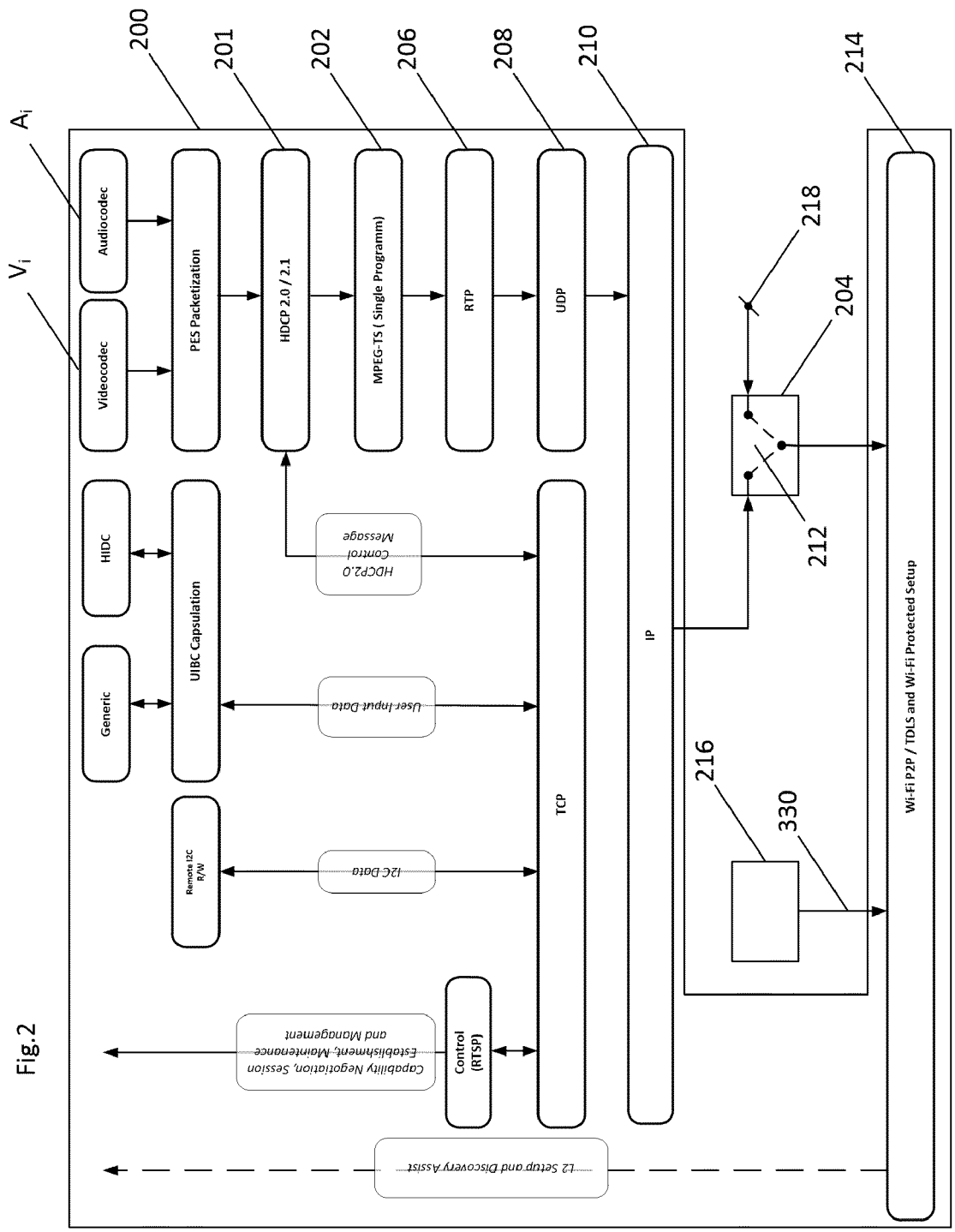
FIG. 2 shows a detailed illustration of the transmission apparatus from FIG. 1.

FIG. 2 shows in detail the transmission apparatus 100 in FIG. 1 and in FIG. 2 is denoted by reference number 200. In block 201, an HDCP (high-bandwidth digital content protection) method known per se is applied to a single video and/or audio information signal Vi, Ai. Block 202 in turn transforms this single (data-protected) video and/or audio information signal (Vi, Ai) into an MPEG-TS compatible data stream which can be transmitted wirelessly.

Packing takes place in block 206 wherein the MPEG-TS compatible data stream is transformed with only this one video and/or audio information signal into an RTP (Real Time Protocol) payload stream. Thereafter, the RTP payload is packed in a UDP (Universal Datagram Protocol) data stream in block 208. The UDP data stream is then packed in an IP (Internet Protocol) data stream in block 210. In block 214, the IP data stream is packed in a WLAN data stream, e.g., in accordance with the standard IEEE 802.11, for wireless transmission to a receiver apparatus (as shown with the reference number 104 in FIG. 1). This WLAN data stream is described in the Wi-Fi Peer-to-Peer (P2P) Technical Specifications Version 1.1 of the Wi-Fi Alliance.

For wireless transmission of an external IP data stream, the transmission apparatus 200 is further provided with an input arrangement 204 for receiving the external IP data stream. The receiver arrangement 204 contains an input terminal 218 via which the external IP data stream is supplied from the Internet (from an external source) to the transmission apparatus 200 and a switching arrangement 212. In a first position of the switch in the switching arrangement 212, the video and/or audio information signal included in IP blocks is supplied by the IP block 210 to block 214 in order to transmit the video and/or audio information signal wirelessly to the receiver apparatus 104. In the other position of the switch in the switching arrangement 212, the external IP data stream at the input terminal 218 is supplied to the receiver apparatus 104 for wireless transmission of the external IP data stream.

Figure 3:
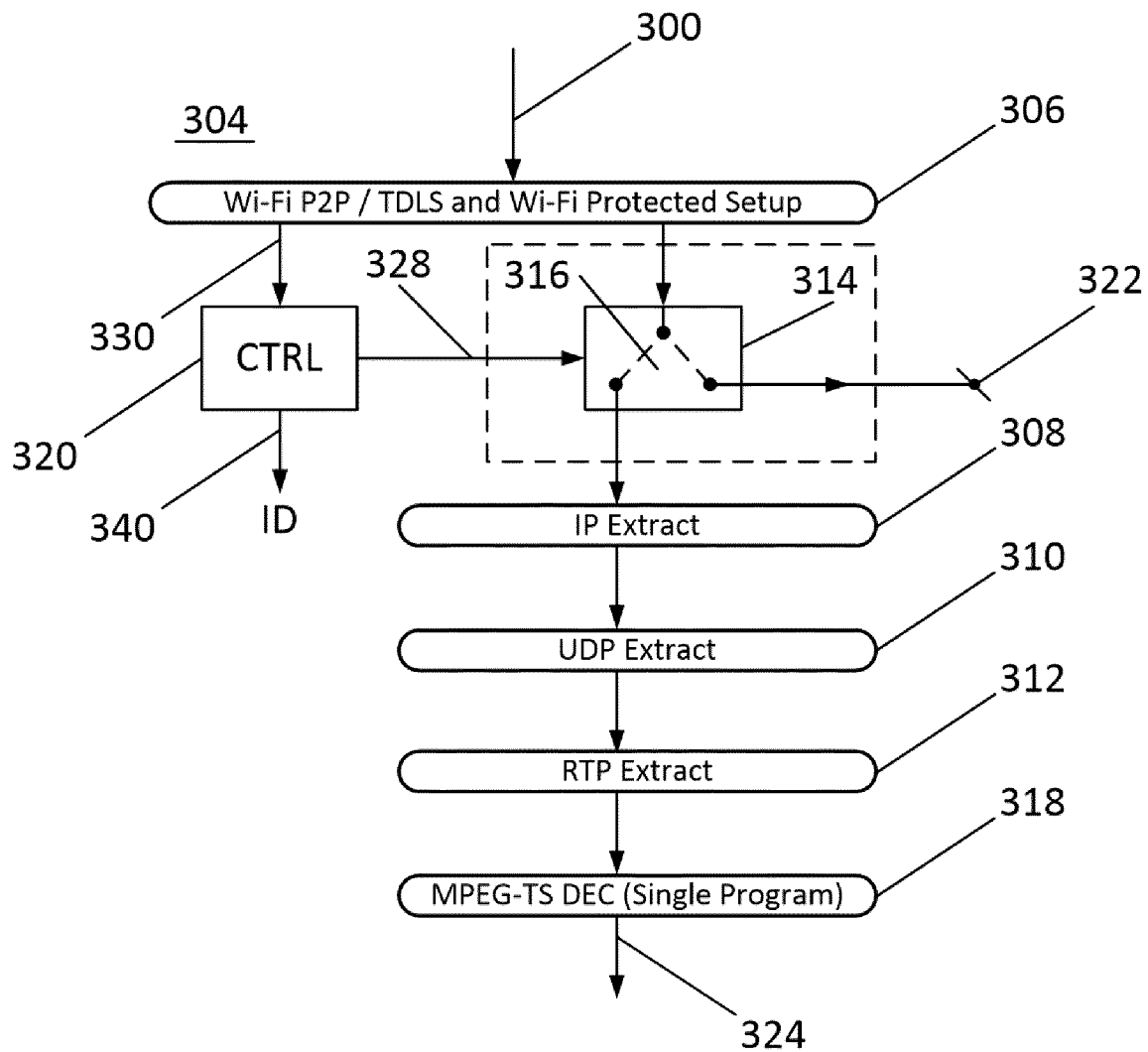
FIG. 3 shows a detailed illustration of the receiver apparatus from FIG. 1.

FIG. 3 shows a detailed illustration of the receiver apparatus 104 in FIG. 1 which is denoted by the reference number 304 in FIG. 3.

The wireless transmission signal 300 is supplied to the Miracast receiver block 306 of the receiver apparatus 304. According to the invention, the receiver apparatus 304 contains an output arrangement 314. The output arrangement 314 contains a switch 316. An output of the receiver block 306 is coupled to an input of the output arrangement 314. An output of the output arrangement 314 is coupled to an input of an IP extraction block 308. A second output of the output arrangement 314 is coupled to an output terminal 322.

In the first position (to the left) of the switch 316, the receiver apparatus 304 works as a known Miracast receiver. An IP data stream containing an MPEG-TS compatible data stream with only one video and/or audio information signal is received and supplied by receiver block 306 to the IP extraction block 308.

A UDP data stream, derived from the IP information blocks in the IP extraction block 308, is supplied via an output of the block 308 to an input of a UDP extraction block 310. An RTP data stream, derived from the UDP data blocks in the UDP extraction block 310, is supplied via an output of the block 310 to an input of an RTP extraction block 312. An MPEG-TS compatible data stream, derived from the RTP data blocks in the RTP extraction block 312, which contains only one video and/or audio information signal, is supplied via an output of the block 312 to an input of an MPEG decoding unit 318. The one programme is then derived as a video and/or audio information signal 324 in the decoding unit 318 such that it can be played back on a screen (not shown in FIG. 3).

For the case according to the invention, in which an external IP data stream is transmitted from the transmission apparatus to the receiver apparatus 304, the switch 316 is in the other position (to the right). This means that the transmitted external IP data stream is present at the output terminal 322 for further processing in the receiver apparatus. To control the switch 316 in the correct position, a switching signal generation unit 320, for example, can be provided which generates a switching signal 328 depending on which type of transmission signal is received (a Miracast standard-compliant transmission signal or an external IP data stream), which transmission signal switches over the switch into either the one or other switch position. The switching signal 328 is derived in the generation unit 320 from a control signal 330 which is transmitted by the transmission apparatus 200 to the receiver apparatus 304. For this, the transmission apparatus 200 is additionally provided with a control signal generation unit 216 (see FIG. 2) which generates the control signal 330 and supplies it to the wireless transmission unit 214.

In addition, an identification signal could also be generated in the transmission apparatus 200 and transmitted to the receiver apparatus 304, namely in case it is specified with which (container) format the external IP data stream is transmitted. This indication signal (sic) can be transmitted to the receiver apparatus 304 together with the control signal as an assembled control signal (composite control signal) 330. In the receiver apparatus 304, this identification signal 330 (ID) can then be derived in the unit 320 and can be supplied to an internal (that is in the receiver apparatus 304) or external signal processing unit (not shown) for further processing of the external IP data stream.

In addition, the following should also be mentioned in relation to the embodiment of the receiver apparatus in FIG. 3. The external IP source 102 in FIG. 1 for generating the external IP data stream is constructed in the same way as the signal generation setup in the transmission apparatus 100. Also in the external IP source 102, in this specific case a single video and/or audio information signal is MPEG encoded to obtain an MPEG-TS data stream and is then further processed in an RTP, UDP and IP encapsulation stage to obtain the external IP data stream. This means that the signal processing in the receiver apparatus 304 according to FIG. 3 can also be different. In this case, the signal processing of the external IP data stream in the receiver apparatus 304 could also be carried out by the stages 308, 310, 312 and 318 to derive the single video and/or audio information signal of the external IP source 102 in FIG. 1. At a later point in the description of the figures relating to FIGS. 5 and 6, it becomes clear that the output arrangement 314 with the switch 316 is necessary in order to divert external IP data streams, which have only undergone one IP encapsulation, once more in the receiver apparatus.

Here too, it should be mentioned that the output arrangement 314 can also be arranged between the IP extraction stage 304 and the UDP extraction stage 310. The reason is that the received external IP data stream must first be processed in an IP extraction stage during further processing after reception. This IP extraction can also be carried out in the IP extraction stage 308 of the receiver apparatus 304.

Figure 4:
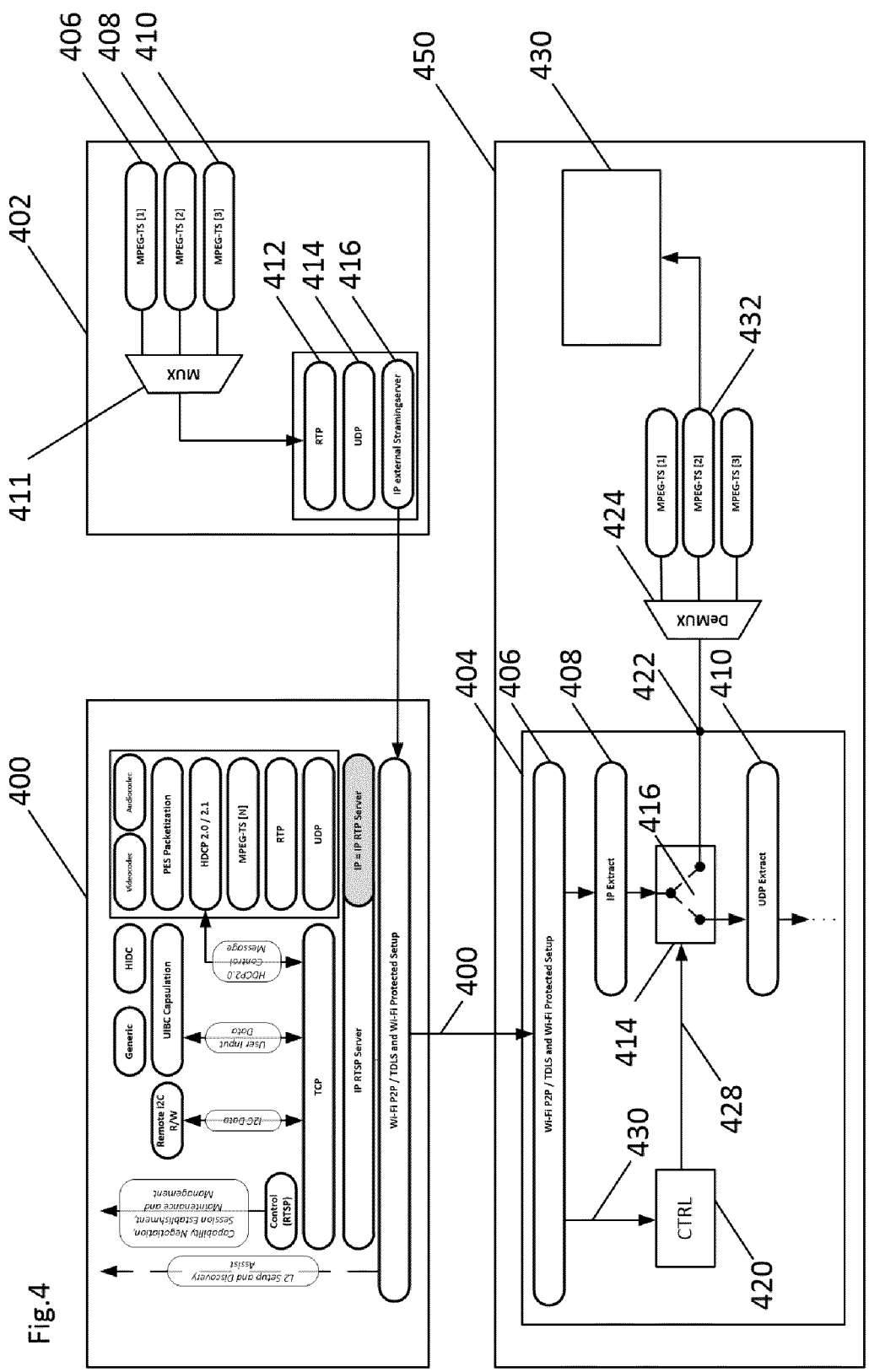
FIG. 4 shows an embodiment of a transmission of an external IP data stream which contains a plurality of MPEG transport streams.

FIG. 4 shows an embodiment, wherein an MPEG transport stream (TS) is contained in the external IP data stream which in this embodiment contains three elementary streams. FIG. 4 shows a Miracast-compatible transmission apparatus 400 like the transmission apparatus 100 in FIG. 1 and an external IP source 402. This external IP source 402 receives or generates (e.g., from a program memory (not shown) in which a plurality of A/V elementary streams are stored) in this case three elementary streams 406, 408 and 410 which are pulled together into one MPEG-TS in a multiplexer unit 411. Then this MPEG-TS is embedded in an RTP (Real Time Protocol) payload in a block 412. Then the RTP payload stream is embedded in a UDP (Universal Datagram Protocol) payload in the block 414. The UDP data stream is then embedded in an IP (Internet Protocol) data stream in the block 416 to obtain the external IP data stream which is transmitted to the transmission apparatus 400, namely in the same way as has already been described, for example, based on FIGS. 1 and 2.

On the receiver side, there is also a Miracast-compatible receiver apparatus 404 which in this case is integrated in a television set 450. The external IP data stream is transmitted by the transmission apparatus 400 to the receiver apparatus 404. In the receiver apparatus 404, the external IP data stream is diverted by means of the output arrangement 414, which in this case is arranged between the IP extraction stage 408 and the UDP extraction stage 410 and is present at the output terminal 422. This happens in the same way as already described, for example, based on FIGS. 1 and 3. A switching signal 428 for controlling the switch position of the switch 416 is generated in the switching signal generation unit 420 from a control signal 430 which is transmitted by the transmission apparatus 400 to the receiver apparatus 404.

The television set 450 contains a demultiplexer unit 424 in which, as required, one of the three elementary streams, e.g., data stream 432, corresponding to data stream 408 after decoding, is forwarded to a screen 430 as an A/V information signal.

Figure 5:
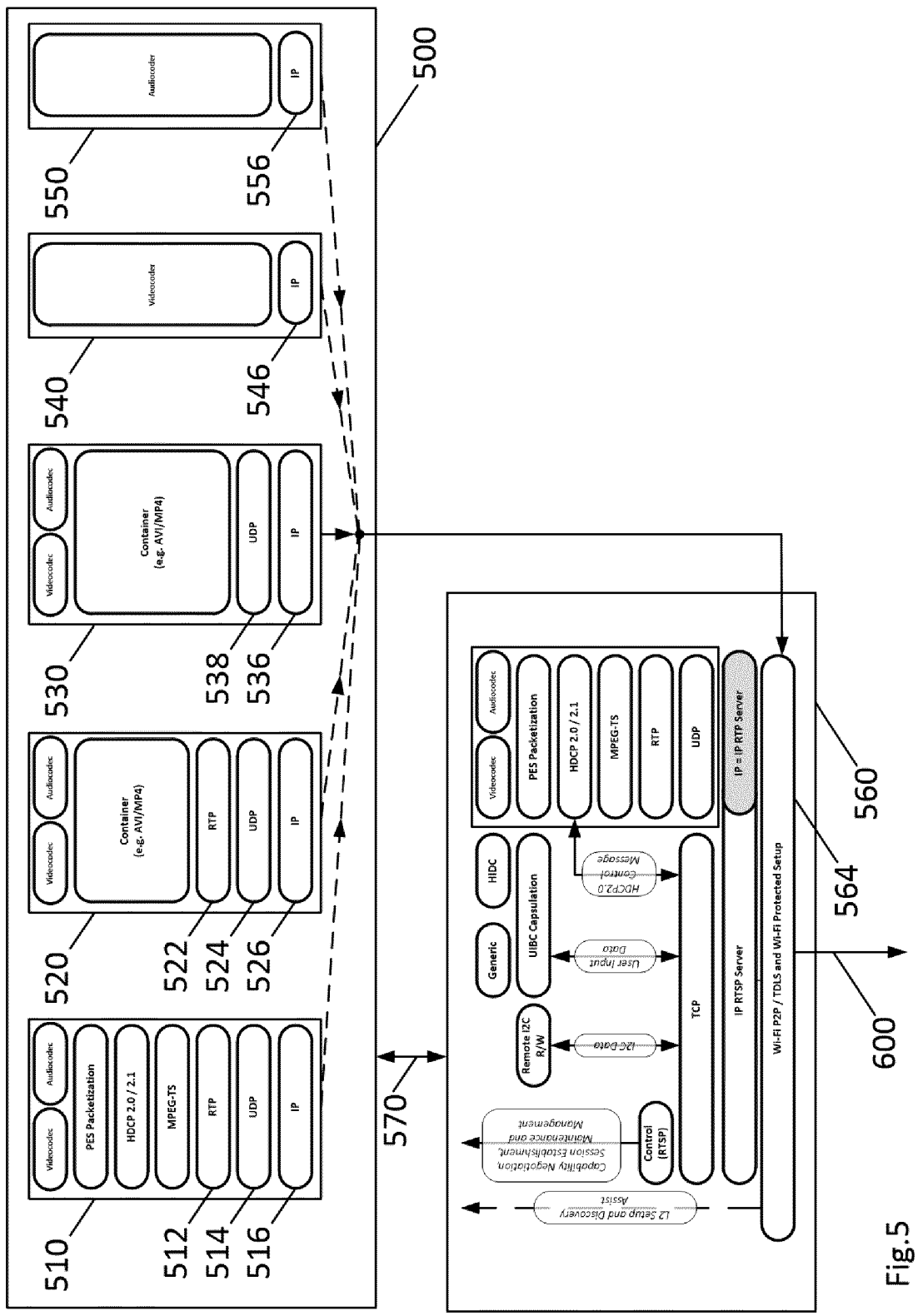
FIG. 5 shows an embodiment of a transmission of an external IP data stream wherein there are several or other unspecified streaming formats for the external IP data stream.

FIG. 5 shows an embodiment, in which there are a plurality of external IP sources which also offer a plurality of not yet specified streaming formats as external IP data streams. The external IP sources are located, for example, in the Internet 500.

FIG. 5 shows, for example, an external IP source 510 which generates an external IP data stream in that a single audio and/or video information signal is, inter alia, MPEG encoded and after processing is embedded in a block 512, the MPEG-TS compatible data stream being packed with only one video and/or audio information signal in an RTP (Real Time Protocol) payload. Thereafter, the RTP payload is embedded in a UDP (Universal Datagram Protocol) payload in the block 514. The UDP payload is then embedded in an IP (Internet Protocol) payload in block 516.

In a network 500, e.g., Internet, there is yet a second IP source 520 wherein a video and/or audio information signal is encoded in a manner known per se or with a new method and is then embedded in an RTP (Real Time Protocol) payload in a block 522. The RTP payload is then embedded in a UDP (Universal Datagram Protocol) payload in the block 524. The UDP payload is then embedded in an IP (Internet Protocol) payload in the block 526.

In the Internet 500, there is yet a third IP source 530 in which a video and/or audio information signal is encoded into a DVB compatible data stream in another manner known per se and this DVB compatible data stream is included in an MPEG transport stream. This MPEG transport stream is then embedded directly in an IP (Internet Protocol) data stream in a block 536.

In the Internet 500, there is yet a fourth IP source 540 in which a video information signal is encoded in a manner known per se, such as H.264 or H.265, and is then converted directly into an IP (Internet Protocol) data stream in a block 546.

In the Internet 500, there is yet a fifth IP source 550 in which an audio information signal (or a speech signal) is encoded in a manner known per se in an audio encoding unit (or speech encoding unit) and is then converted directly into an IP (Internet Protocol) data stream in a block 556. Examples of an audio encoding unit are, e.g., an MPEG audio encoding unit (such as an MP3 encoding unit), an AAC encoding unit, an OGG encoding unit or a FLAC encoding unit. Examples of a speech encoding system are, e.g., AMR (Adaptive Multi-Rate), CELP (Code Excited Linear Prediction), GSM and G.711 (and higher versions).

The transmission apparatus 560 according to the invention has a coupling 570 to the Internet 500. Via this coupling 570, the transmission apparatus 560 can obtain information, subsequently referred to as source information, about the external IP sources 510, 520, 530, 540 and 550 which are located on the Internet 500. This source information includes, e.g., the identity of the external IP sources,
the addresses of the external IP sources, such as IP addresses and/or URLs,
the type of signals which the IP sources provide. In this case, it should be noted how the signals are encoded, what the quality of the signals is, what the band width of the signals is and what the aspect ratio is (aspect ratio in the case of video signals),
the name of the broadcasting company which operates this source, e.g., ARD, ZDF and BR (all German broadcasting companies) and
a list of the programmes that are broadcast by a broadcasting company.

The information about the sources can then be used in the communication with a transmission apparatus according to the invention to determine whether a desired programme of the user of the receiver apparatus can be supplied by the transmission apparatus 560.

The execution is as follows in that it is determined in the first session setup step which signal processing capabilities the receiver apparatus has and that the transmission apparatus 560 knows these signal processing capabilities of the receiver apparatus.

Via the connection 570 to the Internet, the transmission apparatus 560 has determined the above-mentioned source information, e.g., a list with appropriate content can be stored on one or a plurality of web servers and can generate a source list with possible external IP sources (or broadcasting companies) which can be transmitted by the transmission apparatus 560 to the receiver apparatus. In addition, a programme list of programmes which one or a plurality of broadcasting companies broadcast via an external IP source on one day (or a part of the day) can be generated from the source information. Video-on-demand also represents an option.

Once a connection is established between the transmission apparatus 560 and a receiver apparatus according to the invention, the transmission apparatus 560 can transmit this source list and programme list to the receiver apparatus according to the invention, e.g., in the Session Setup. This can also be implemented later, for example, by means of a beacon known per se.

The data streams of the external IP sources in FIG. 5 are always video and/or audio data streams in this embodiment. It should be mentioned here, however, that the information which can be supplied by the external IP sources may also include any data (without it necessarily including video and/or audio information).

Figure 6:
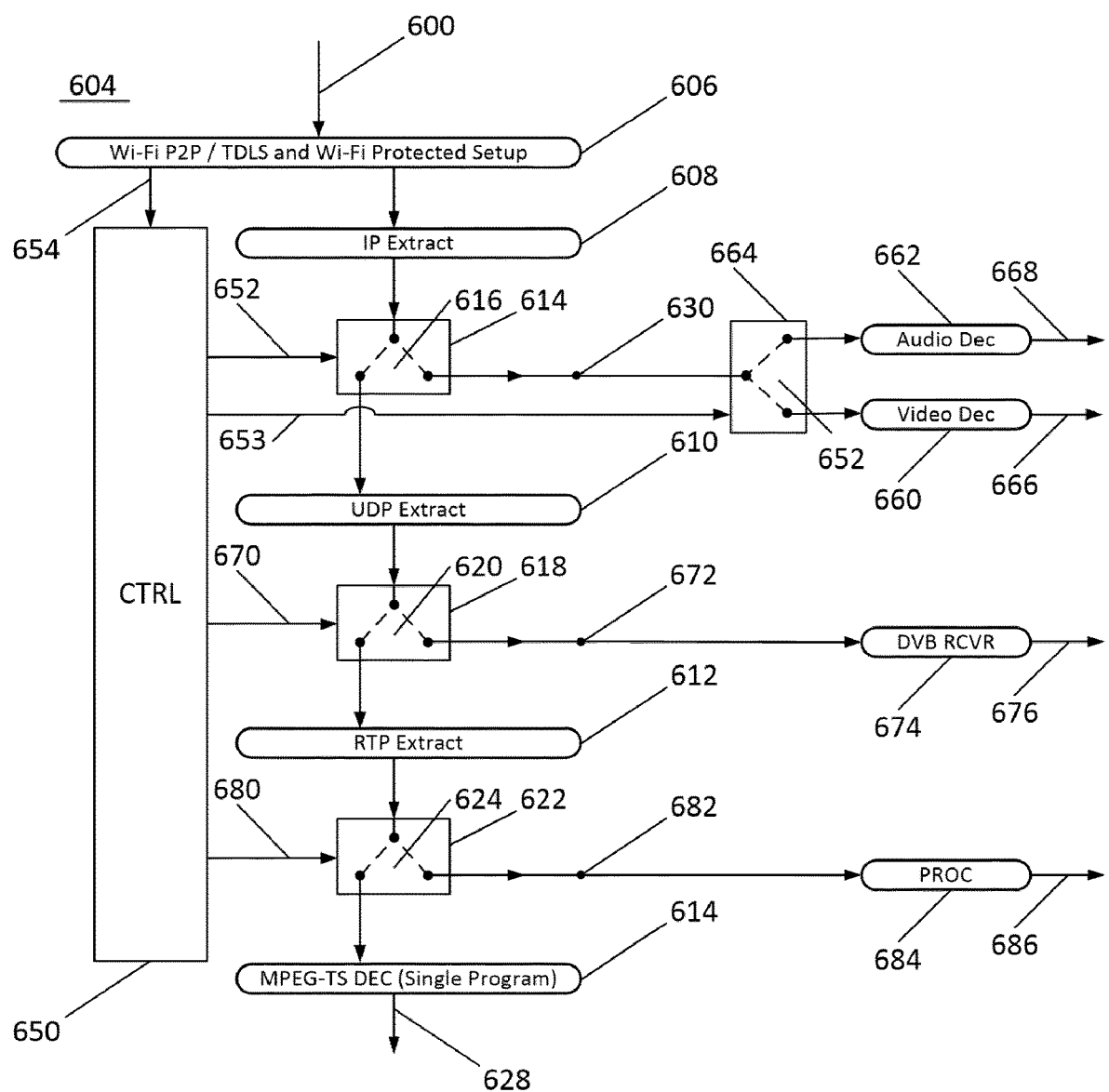
FIG. 6 shows an embodiment of a receiver apparatus which is configured to cooperate with the transmission apparatus according to FIG. 5.

FIG. 6 shows a receiver apparatus 604 according to the invention which is configured to cooperate with the transmission apparatus in FIG. 5. It is assumed here that the receiver apparatus 604 is configured to receive and process the external IP data streams from all external IP sources 520, 530, 540 and 540, as shown in FIG. 5. Generally, however, this cannot always be the case since of course the signal processing potential in a receiver apparatus is always limited.

The receiver apparatus 604 thus receives from the transmission apparatus 560 the programme list (for a single MPEG-TS) or the source list and the programme list (for a multi MPEG-TS) which can be displayed for the user of the receiver apparatus 604 on a screen (not shown in FIG. 6). The user can the select a source from the source list, e.g., an external IP source, which is operated by a broadcasting organisation, e.g., the ARD. In addition, the user, if the need arises (and if possible) can select a specific transmission programme which is broadcast by the ARD.

First, the request and transmission of an external IP data stream by one of the sources 540 and 550 is described. The receiver apparatus tells the transmission apparatus 560 during the setup which formats the receiver apparatus supports. The transmission apparatus 560 can then find other external sources 500, e.g., publicly known servers, via a network, the Internet for example, and tell the receiver. The address (either as IP address or as URL) which characterises the IP source 540 is transmitted by the transmission apparatus 560 to the receiver apparatus 604 as has already been described based on FIGS. 1, 2 and 3. The receiver apparatus 604 can now receive the IP information blocks with an IP address (which has been derived if necessary by means of a URL) of the IP source 540 from the transmission apparatus 560 via the wireless Miracast transmission path [with the transmission apparatus 560] as a wireless transmission signal 600.

The wireless transmission signal 600 is offered to the Miracast receiver block 606 of the receiver apparatus 604. According to the invention, the receiver apparatus 604 contains the output arrangement 614. The output arrangement 614 contains a switch 616. An output of the receiver block 606 is coupled to an input of the output arrangement 614. An output of the output arrangement 614 is coupled to an input of an IP extraction block 608. A second output of the output arrangement 614 is coupled to a signal terminal 630.

When an external IP data stream is transmitted from the IP source 540 by the transmission apparatus 560 to the receiver apparatus 604, the switch 616 is switched in the right-hand position. This means that the transmitted external IP data stream is offered for further processing (e.g., in the receiver apparatus 604 itself) at the signal terminal 630. To control the switch 616 in the correct position, a switching signal generation unit 650 is again provided which is received depending on the type of the transmission signal (a Miracast standard-compliant transmission signal or an external IP data stream) and generates such as switching signal 652 and switches over the switch 616 into either the one or other switch position. The switching signal 652 is derived in the generation unit 650 from a control signal 654 which is transmitted by the transmission apparatus 560 to the receiver apparatus 604. For this, the transmission apparatus 560, exactly as described based on FIGS. 2 and 3, is additionally provided with a control signal generation unit (not shown in FIG. 5) which generates the control signal 654 and supplies it to the wireless transmission unit 564.

The external IP data stream from the IP source 540 is an encoded video information signal which is, for example, H.265 encoded and then directly encapsulated in IP information blocks. The external IP data stream from the IP source 550 is an encoded audio information signal which is, for example, MP3 encoded and then directly encapsulated in IP information blocks. In this case, the receiver apparatus 604 additionally includes an H.265 decoding unit 660 and an MP3 decoding unit 662, the inputs of which are coupled via a switching arrangement 664 to the signal terminal 630. A switching signal 653 is additionally supplied to the switching arrangement 664 to control the switch position in said switching arrangement 664. On reception of the external IP data stream of the IP source 540, the switch position of the switching arrangement 664 is additionally controlled in such a way that the switch in said switching arrangement 664 is in the downward position so that the encoded video information signal, which is derived from the IP information blocks in the IP extraction stage 608, can be H.265 decoded in the video decoding unit 660 and is then present as a decoded video information signal at an output terminal 666.

On reception of the external IP data stream of the IP source 550, the switch position of the switching arrangement 664 is additionally controlled by the switching signal 653 in such a way that the switch in said switching arrangement 664 is in the upward position so that the encoded audio information signal, which is derived from the IP information blocks in the IP extraction stage 608, can be MP3 decoded in the audio decoding unit 662 and can then be offered as a decoded audio information signal at an output terminal 668. The switching signal 653 is derived from the control signal 654 in the switching signal generation unit 650 in a similar manner to the switching signal 652.

The receiver apparatus 604 can additionally be provided with a switching arrangement 618 which is arranged between the UDP extraction stage 610 and the RTP extraction stage 612. For controlling a switch 620 in the switching arrangement 618 into the correct position, the switching signal generation unit 650 again generates a switching signal 670, depending on which type of transmission signal is received (a Miracast standard-compliant transmission signal—towards the left—or an external IP data stream—towards the right) such that the switch 620 is switched over to either one or the other position. The switching signal 670 is derived in turn in the generation unit 650 from the control signal 654 which is transmitted by the transmission apparatus 560 to the receiver apparatus 604.

The request and transmission of an external IP data stream by the source 530 is described below. The receiver apparatus 604 transmits a request to supply an external IP data stream from the external source 530 to the transmission apparatus 560. The address (an IP address or a URL) of the IP source 530 is communicated by the transmission apparatus 560 to the receiver apparatus 604, as already described based on FIGS. 1, 2 and 3. The receiver apparatus 604 can now receive the IP information blocks with an IP address (which has been derived if necessary by means of a URL) of the IP source 530 from the transmission apparatus 560 via the wireless Miracast transmission path [with the transmission apparatus 560] as a wireless transmission signal 600.

When an external IP data stream is transmitted from the IP source 530 by the transmission apparatus 560 to the receiver apparatus 604, the switch 616 is in the position towards the left. This means that the transmitted external data stream (which is derived from the IP information blocks) is forwarded to the UDP extraction stage 610. In the UDP extraction stage 610, the UDP headers are removed from the data stream and then forwarded to the switching arrangement 618. The switch 618 is in the position towards the right. This means that the transmitted external IP data stream is offered at a signal terminal 672 for further processing in the receiver apparatus.

The external IP data stream from the IP source 530 is a video and/or an audio information signal which is included in a DVB data stream. In this case, the receiver apparatus 604 additionally contains a DVB decoding unit 674, the input of which is coupled to the signal terminal 672. The video and/or audio information signal, included in the DVB data stream, which is derived in the UDP extraction stage 610, is offered to the DVB decoding unit 674 and decoded therein. The video and/or audio information signal thus obtained is subsequently forwarded to the output terminal 676.

The receiver apparatus 604 can additionally be provided with a switching arrangement 622 which is arranged between the RTP extraction stage 612 and the decoding stage 614. For controlling a switch 624 in the switching arrangement 622 into the correct position, the switching signal generation unit 650 again generates a switching signal 680, depending on which type of transmission signal is received (a Miracast standard-compliant transmission signal—towards the left—or an external IP data stream—towards the right) such that the switch 624 switches over to either one or the other position. The switching signal 680 is derived in turn in the generation unit 650 from the control signal 654 which is transmitted by the transmission apparatus 560 to the receiver apparatus 604.

The request and transmission of an external IP data stream by the source 520 is described below. The receiver apparatus 604 transmits a request to supply an external IP data stream from the external source 520 to the transmission apparatus 560. The IP address of the IP source 520 is transmitted by the transmission apparatus 560 to the receiver apparatus 604, as already described based on FIGS. 1, 2 and 3. The receiver apparatus 604 can now receive the IP information blocks with the IP address of the IP source 520 from the transmission apparatus 560 via the wireless Miracast transmission path [with the transmission apparatus 560] as a wireless transmission signal 600.

When the external IP data stream of the IP source 520 is transmitted by the transmission apparatus 560 to the receiver apparatus 604, the switch 624 is in the position towards the right and the switches 616 and 620 are towards the left. This means that the transmitted external IP data stream is forwarded after processing in the stages 608, 610 and 612 to a signal terminal 682 for further processing in the receiver apparatus.

The external IP data stream from the IP source 520 is a video and/or an audio information signal which is encoded in any manner and has then been processed in an RTP stage, a UDP stage and an IP stage. In this case, the receiver apparatus 604 additionally contains a decoding unit 684, the input of which is coupled to the signal terminal 682. The video and/or audio information signal, included in the IP data stream, which is derived in the IP extraction stage 608, the UDP extraction stage 610 and the RTP extraction stage 612, is forwarded to the decoding unit 684 and decoded therein. The video and/or audio information signal thus obtained is then forwarded to an output terminal 686.

Figure 7:
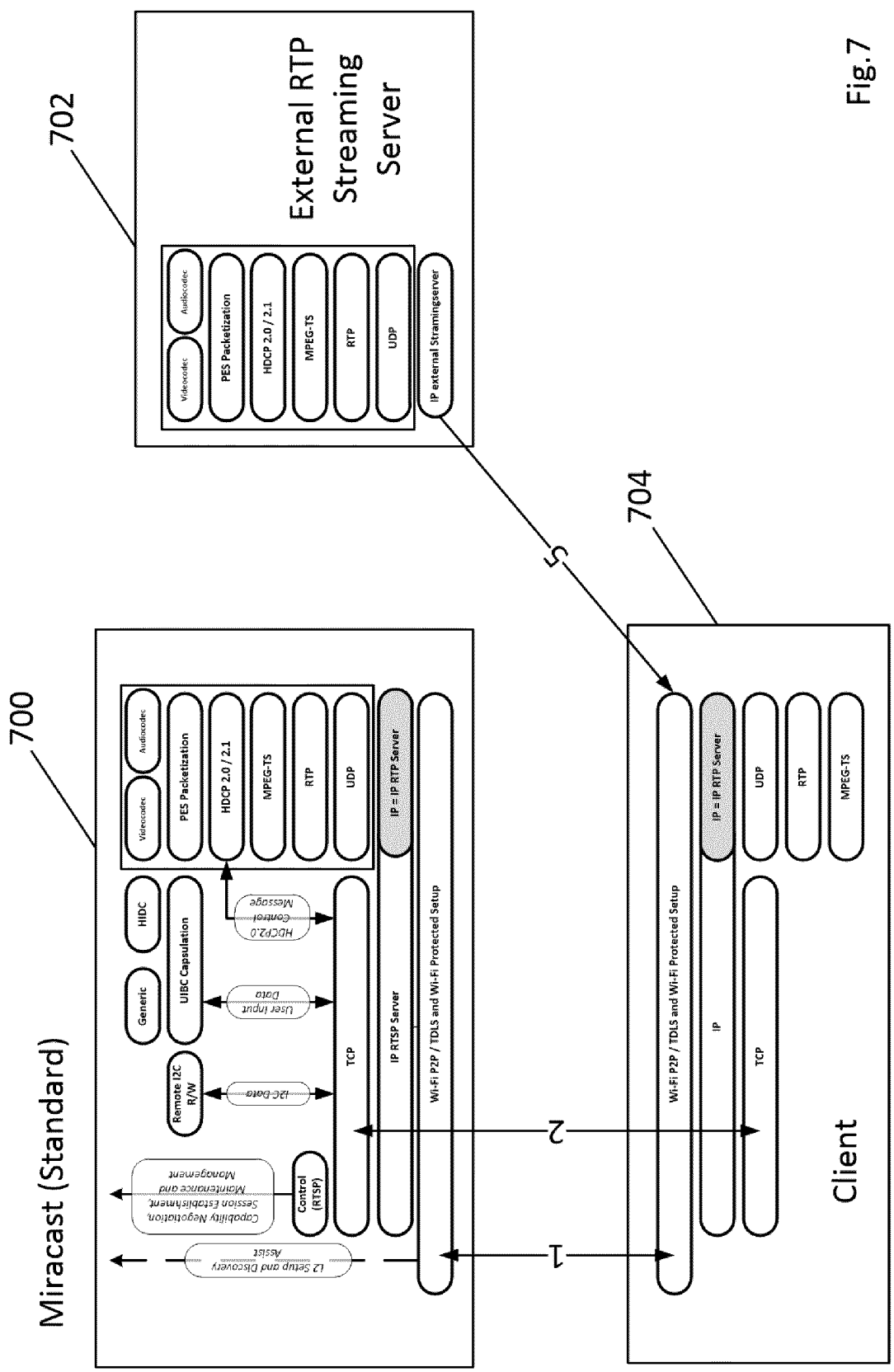
FIG. 7 shows an embodiment of a transmission of an external IP data stream between an external IP source and a Miracast-compatible receiver apparatus, which enables a transmission by means of a Miracast-compatible transmission apparatus, wherein the external IP data stream is transmitted from the external IP source to the receiver apparatus, the transmission apparatus being bypassed in the transmission path between the external IP source and the receiver apparatus.

FIG. 7 shows an embodiment of a transmission of an external IP data stream between an external IP data stream source 702 and a Miracast-compatible receiver apparatus 704, which enables a transmission by means of a Miracast-compatible transmission apparatus 700, wherein the external IP data stream is transmitted from the external IP source to the receiver apparatus (arrow 5), the transmission apparatus being bypassed in the transmission path between external IP source and receiver apparatus.

The procedure is as follows, this procedure having many similarities with the procedure described based on FIG. 1.

In the first step, a connection is also established here between the Miracast-compatible transmission apparatus 700 and the Miracast-compatible receiver apparatus 704. This is indicated by the arrow 1 in FIG. 7. This connection is initiated in the Miracast standard by means of the so-called 'Wi-Fi P2P' method.

In the second step, a 'session setup', as referred to in the Miracast standard, of the Wi-Fi display then takes place. This is indicated by the arrow 2 in FIG. 7.

The Miracast transmission method according to the standard in which a single A/V information signal is wirelessly transmitted by the transmission apparatus 700 as an MPEG-TS compatible transmission signal to the receiver apparatus 704 is not described in greater detail here. For this, reference is made to the description relating to FIG. 1.

According to the invention, if there is a need for a data stream which cannot be supplied by the transmission apparatus 600, then the transmission apparatus 700 is able, e.g., by means of a connection to the Internet (not shown), to search for a source which can supply this desired data stream. It finds the source 702 which supplies this desired data stream as an (external) IP data stream. This source 702 has its own address which is defined here as the second address and, for example, may be an IP address or a URL.

The transmission apparatus 700 knows this second address from the external source 702 and transmits it in a session setup step to the receiver apparatus 704 (arrow 2).

It was also determined in the 'Session Setup' that the receiver apparatus 704 has its own coupling to the Internet (wireless or wired) and that the receiver apparatus 704 can also receive the external IP data stream directly from the Internet by using the second address (arrow 5). Thus the transmission apparatus 700 is bypassed in the transmission chain of the external IP data stream.

Figure 8:
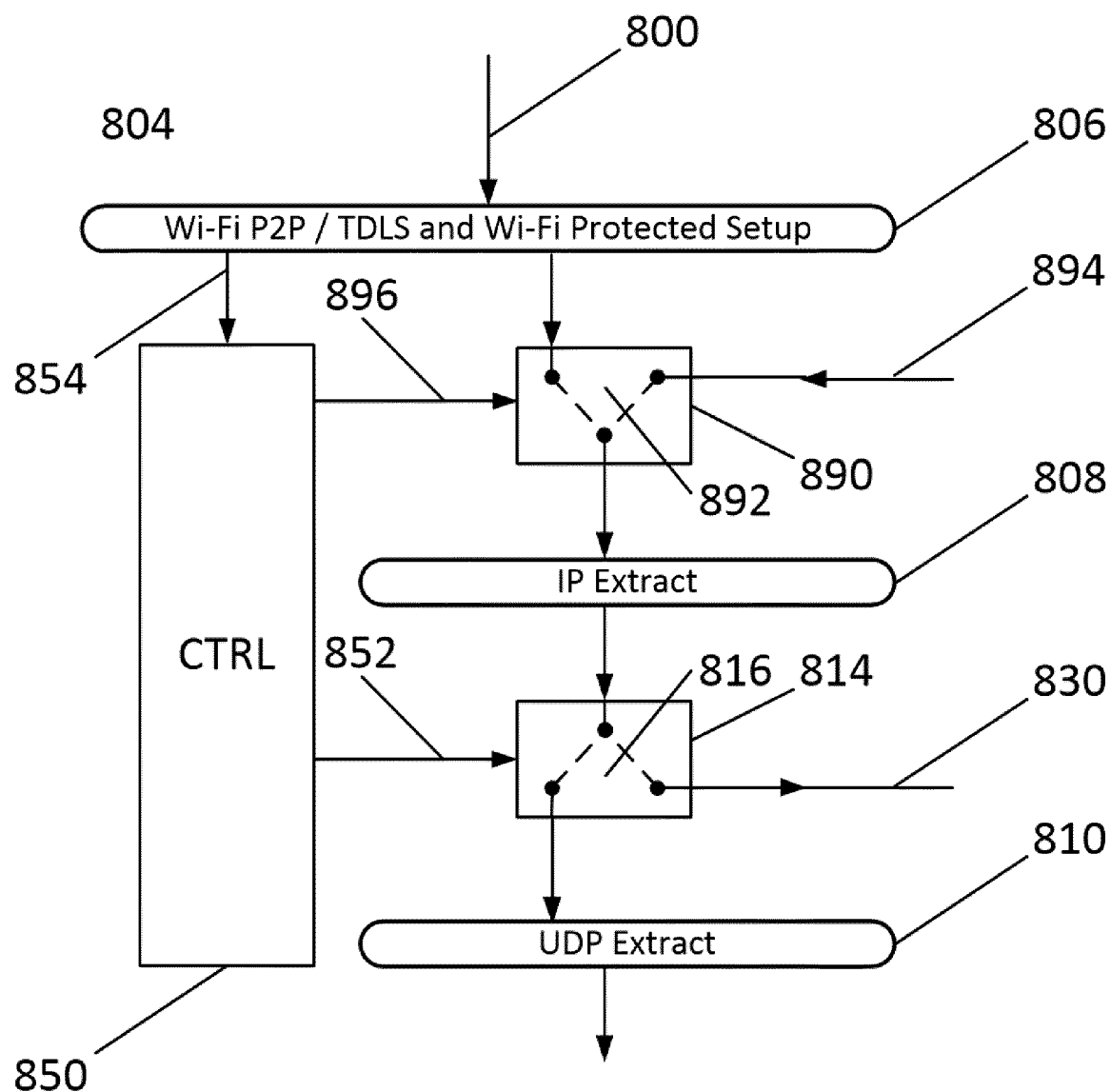
FIG. 8 shows a detailed portion of the Miracast-compatible receiver apparatus according to FIG. 7.

FIG. 8 shows in detail a portion of the receiver apparatus 704 (FIG. 7) which is indicated in FIG. 8 by the reference number 804. An output of the Miracast receiver block 806 is coupled here to a first terminal of an input circuit 890 which includes a switch 892. An input terminal 894 for receiving the external IP data stream from the Internet is coupled to a second terminal of the input circuit 890. A third terminal of the input circuit 890 is coupled to the input of the IP extraction stage 808. The switching position of the switch 892 is controlled by a switch control signal 896 which is indicated by the switching signal generation unit already described in FIGS. 3 and 6 and indicated in FIG. 8 by the reference number 850. If a wireless transmission signal 800 is transmitted by the transmission apparatus 700 to the receiver apparatus 804, the switch 892 is controlled in such a way that it is in the left-hand position so that the received transmission signal (either a Miracast-compatible transmission signal or an external IP data stream which is transmitted via the transmission apparatus 700, as described based on FIGS. 1 to 6) can be forwarded to the IP extraction stage 808.

If, by bypassing the transmission apparatus 700, an external IP data stream is forwarded by a network (e.g., the Internet) 'directly' (that is, after transmission via either an electrical connection or a wireless connection) to the input terminal 894, the switch 892 is controlled by the switch control signal 896 in such a manner that the switch 892 is switched into the position towards the right. Thus the external IP data streams can be forwarded to the IP extraction stage 808. After the IP headers are removed from the information blocks in the external IP data stream in the IP extraction stage 808, the data stream thus obtained is present at the output arrangement 814 which corresponds to the output arrangement 614 in FIG. 6 and the mode of operation of which was described there in detail.

Figure 9:
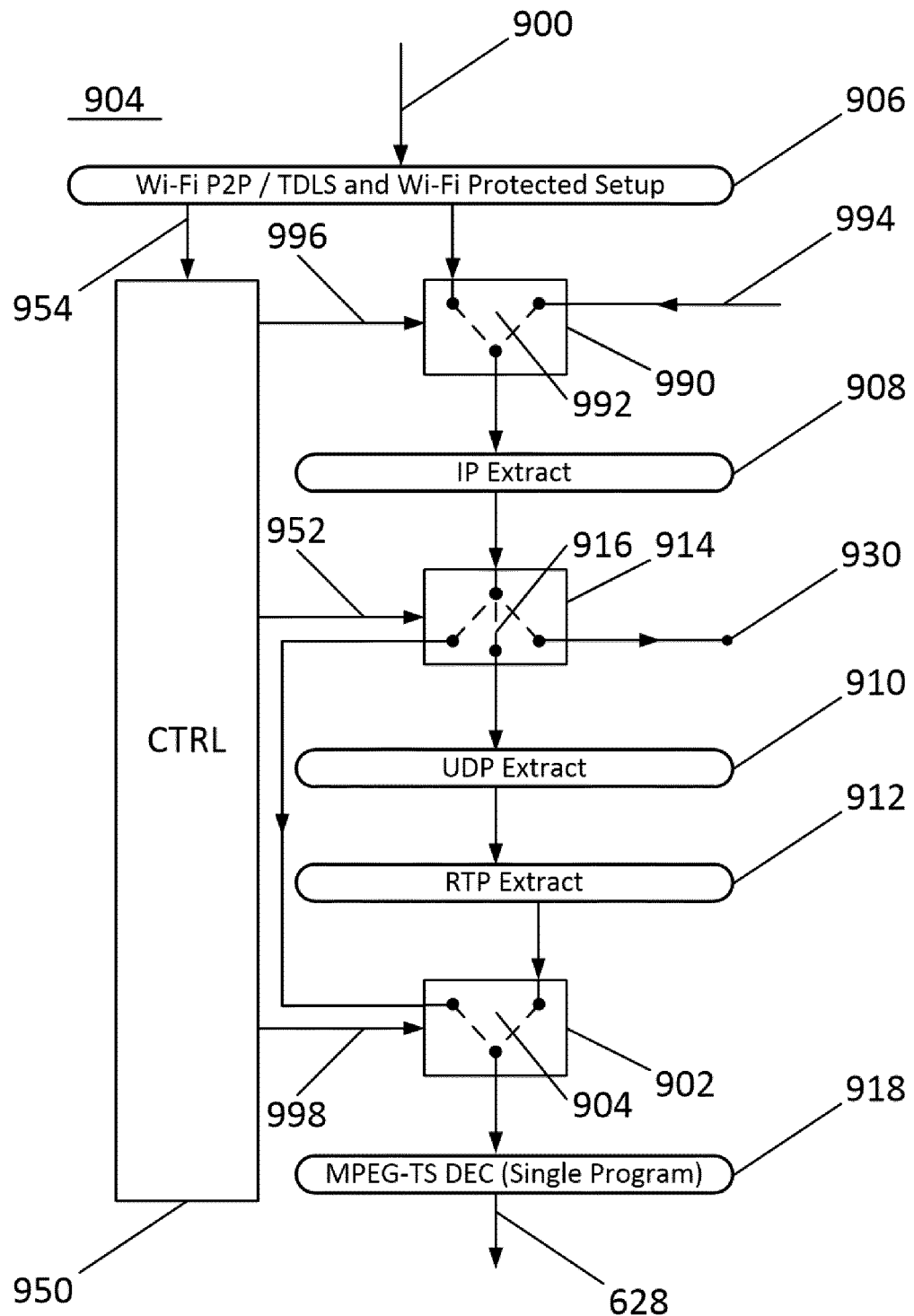
FIG. 9 shows a further embodiment of a receiver apparatus according to the invention.

FIG. 9 shows yet another embodiment of a receiver apparatus according to the invention which largely corresponds to the receiver apparatus in FIG. 6. In FIG. 9, by comparison with the embodiment in FIG. 6, the switching arrangements 618 and 622 were omitted for reasons of clarity. The switching arrangement 614 in FIG. 6 is configured differently in FIG. 9 as switching arrangement 914. In addition, a switching arrangement 902 is arranged between the RTP extraction stage 912 and the MPEG-TS decoding stage 918 and in this embodiment, a switching arrangement 990 is arranged between the receiver block 906 and the IP extraction stage 908.

This receiver apparatus 904 is suitable for receiving an external IP data stream which was obtained by the direct encapsulation (embedding) of an MPEG-TS data stream of a single video and/or audio information signal in IP data blocks, as already described, for example, based on the mode of operation of the IP sources 540 and 550 in FIG. 5.

When such an IP data stream is received (either via the wireless connection 900 or via the input terminal 994), the switching arrangement 990 is controlled by the switching signal 996 in such a manner that this IP data stream is forwarded to the IP extraction stage 908. The extraction stage 908 supplies an output signal to the switching arrangement 914 which is now provided with three switch positions. If the output signal of the IP extraction stage 908 is to be forwarded to the output terminal 930, the switching signal 952 controls the switch 916 in such a manner that the switch position is towards the right. If the output signal of the IP extraction stage 908 is to be forwarded to the UDP extraction stage 910, the switch 916 is in the vertical switching position, facing downward. In the current case, the output signal of the IP extraction stage 908 is already an MPEG-TS data stream which contains a single video and/or audio information signal. This signal can thus be forwarded directly to the MPEG decoding stage 918. For this there is a third switch position of the switch 916, that is towards the left. In this position towards the left, the MPEG-TS data stream is supplied directly to the switching arrangement 902. In addition, the switch 904 in the switching arrangement 902 is under the influence of a switching signal 998 in the position towards the left such that the MPEG-TS data stream is forwarded to the decoding unit 918 and can be decoded therein.

Figure 10:
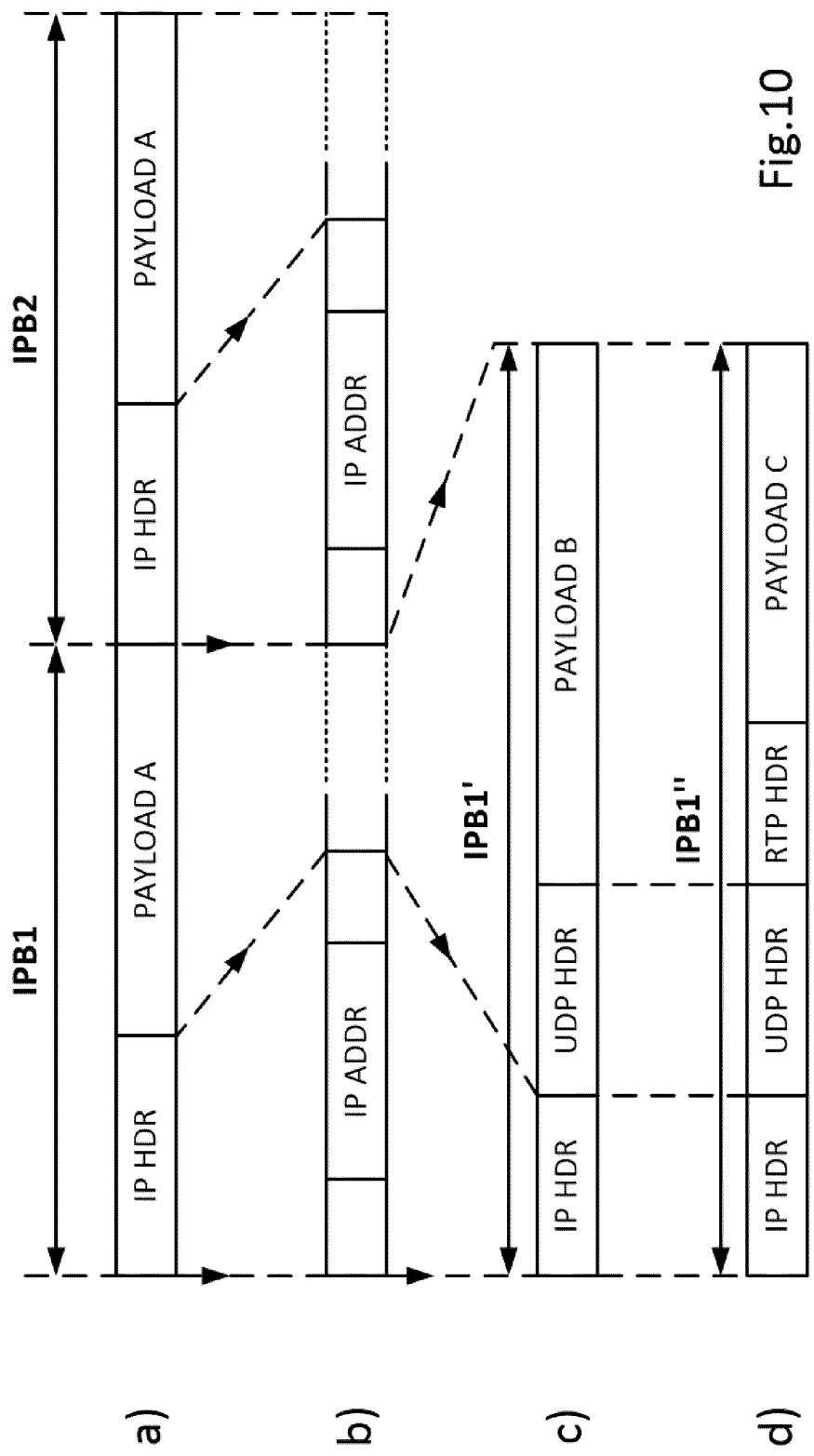
FIG. 10 shows a few embodiments of an IP data stream and how this data stream can be transmitted from the transmission apparatus according to the invention to the receiver apparatus according to the invention or from the external IP source to the receiver apparatus according to the invention.

FIG. 10 shows a few embodiments of an IP data stream and how it can be transmitted from the transmission apparatus according to the invention to the receiver apparatus according to the invention or from the external IP source to the receiver apparatus according to the invention. The IP data stream, as illustrated schematically in FIG. 10a, contains the IP information blocks . . . , IPB1, IPB2, . . . . The IP information blocks are composed of a header, referred to as an IP HDR and an information portion, referred to as payload A. The headers IP HDR of the IP information blocks IPB contain, as shown in FIG. 10b, the IP addresses described above, referred to as IP ADDR. The data stream in FIGS. 10a and 10b can be generated, for example, by the external IP sources 540 and 550 from FIG. 5.

FIG. 10c shows an IP data stream as can be generated by the external IP source 530 from FIG. 5. Here, in the IP information blocks IPB, behind the header IP HDR, another additional header UDP HDR is provided which is added in the UDP encapsulation stage 538 of the IP source 530.

FIG. 10d shows an IP data stream as can be generated by the external IP sources 520 and 510 from FIG. 5 or by the transmission apparatus according to the invention itself. Here, in the IP information blocks IPB, behind the header IP UDP, another additional header RTP HDR is provided which is added in the RTP encapsulation stages 522 and 512 of the IP sources 520 and 510 respectively (or in the RTP encapsulation stage of the transmission apparatus 100—FIG. 1—of the transmission apparatus 700—FIG. 7—or the RTP encapsulation stage 200 of the transmission apparatus 200—FIG. 2)

It should additionally be mentioned that, apart from the features according to the invention for the transmission apparatus according to the invention, it is only essential that it is able to process at least a single video and/or audio information signal in accordance with the Wi-Fi Display Technical Specification of the Wi-Fi Alliance, e.g., in the Version 1.1.0 (Miracast) and to transmit it wirelessly. This means that the MPEG-TS data stream is RTP encapsulated (or embedded), thereafter UDP encapsulated and is then encapsulated to obtain the IP data stream.

It should additionally be mentioned that, apart from the features according to the invention for the receiver apparatus according to the invention, it is only essential that it is able to receive and process at least a single wirelessly transmitted video and/or audio information signal which is transmitted by a transmission apparatus in accordance with the Wi-Fi Display Technical Specification of the Wi-Fi Alliance, as for example in the Version 1.1.0 (Miracast), namely in such a way that a replica of the single video and/or audio information signal is generated. This means that the wirelessly received transmission signal UDP thereafter is RTP extracted and then IP extracted.

A. This means that a further embodiment of the transmission apparatus according to the invention for wireless transmission of an MPEG-TS (Transport Stream) compatible data stream to a receiver apparatus, can be further so defined as that the transmission apparatus is provided with a terminal for receiving an MPEG-TS compatible data stream, and is further adapted to wirelessly transmit a first IP address characterising the transmission apparatus to a receiver apparatus, the transmission apparatus being further adapted to combine the first IP address with the MPEG TS compatible data stream before wireless transmission to the receiver apparatus, the transmission apparatus being further adapted to allow the receiver apparatus to receive an external IP data stream from an external signal source, and the transmission apparatus being further adapted to wirelessly transmit a second address to the receiver apparatus, the said second address characterising the external signal source.

B. The transmission apparatus can be further provided with an input arrangement for receiving the external IP data stream, and the transmission apparatus is adapted to wirelessly transmit the external IP data stream to the receiver apparatus.

C. This also means that a further embodiment of the receiver apparatus according to the invention can be further so defined in that it comprises a receiver block for cooperating with the above-mentioned transmission apparatus B, the receiver apparatus being adapted to receive the external IP data stream from the transmission apparatus using the second address which was previously transmitted by the transmission apparatus to the receiver apparatus.

D. This also means that a different embodiment of the receiver apparatus according to the invention can be further so defined in that it comprises a receiver block for cooperating with the above-mentioned transmission apparatus A, the receiver apparatus being adapted to receive the external IP data stream from the external IP source using the second address which was previously transmitted from the transmission apparatus to the receiver apparatus, and transmission of the external IP data stream taking place from the external signal source to the receiver apparatus by bypassing the transmission apparatus.

E. The receiver apparatus can be further provided with an additional input for receiving the external IP data stream.

F. The transmission apparatus B can further comprise an RTP processing block to carry out an RTP processing step on the MPEG-TS compatible data stream, a UDP processing block for carrying out a UDP processing step on the MPEG-TS compatible data stream processed in the RTP processing block, and an IP processing block for carrying out an IP processing step on the MPEG-TS compatible data stream processed in the UDP processing block, the input arrangement comprising a switching arrangement for switching between the internal MPEG2-TS compatible data stream processed in the IP processing block and the external IP data stream.

G. An output of the switching arrangement can be coupled in this case to a transmission block for wirelessly transmitting the output signal of the switching arrangement.

H. The transmission apparatus according to the invention can be further provided with
  a first block for establishing a Wi-Fi peer-to-peer connection with a receiver apparatus,
  a second block for carrying out a Session Setup procedure, the second block being adapted to generate the first IP address for transmission said first address to the receiver apparatus, and the second block being adapted to make available for the receiver the second address, the said second address being the address characterising the external IP source supplying the external IP data stream, and the second block being adapted to transmit the said second address to the receiver apparatus.

I. In this case, the transmission apparatus H is further adapted to generate an indicator signal, the said indicator signal indicating the format of the external IP data stream, and the transmission block is further adapted to transmit the indicator signal to the receiver apparatus before transmitting the external IP data stream to said receiver apparatus.

J. The receiver block in the receiver apparatus C, D or E can, for cooperation with the transmission apparatus I, be further adapted to receive the wirelessly transmitted indicator signal and the receiver apparatus further comprises an output arrangement for outputting the external IP data stream, in response to the received indicator signal.

K. The receiver block in the receiver apparatus C, D or E can, for cooperation with the transmission apparatus I, also be adapted to receive the wirelessly transmitted indicator signal and the receiver apparatus further comprises an output arrangement for outputting an external IP data stream, which after extraction of IP headers in the external IP data stream in the IP extraction stage, was obtained in response to the received indicator signal.

L. The receiver apparatus C, D or E can be further provided with an additional output arrangement for outputting, in response to the wirelessly transmitted indicator signal, an external data stream, obtained after extraction of IP headers from the external IP data stream in an IP extraction stage and after extraction of UDP headers in a UDP extraction stage.

M. The receiver apparatus C, D or E can also be further provided with an additional output arrangement for outputting, in response to the wirelessly transmitted indicator signal, an external data stream, obtained after extraction of IP headers from the external IP data stream in an IP extraction stage and after extraction of UDP headers in a UDP extraction stage and after extraction of RTP headers in an RTP extraction stage.

N. Receiver apparatus J, K, L or M can be additionally provided with a signal decoding unit, coupled to one of the output arrangements, for decoding the external IP data stream, having a format corresponding to the received indicator signal.

O. The output arrangement in the receiver apparatus J or K can additionally comprise a switching arrangement for switching between the reception of a wirelessly transmitted MPEG2-TS Miracast-compatible data stream and the reception of said external IP data stream, an input of the switching arrangement being coupled to an output of the receiver block, a first output being coupled to an input of a decoding unit, for decoding the MPEG-TS Miracast compatible data stream, and a second output being coupled to an output terminal for directly outputting the external IP data stream.

P. The receiver apparatus O can comprise additional switching arrangements that are provided with a third output for directly supplying the external data stream to an MPEG decoding unit.

Q. The receiver apparatus E can be further provided with a further switching arrangement, wherein a first input terminal of the switching arrangement is coupled to the input, a second input terminal is coupled to the output of the receiver arrangement, and an output terminal is coupled to the input of an IP extraction stage.

The invention claimed is:

1. A receiver apparatus, for wirelessly receiving an MPEG-TS (Transport Stream) compatible data stream, according to a Wi-Fi Display Technical Specification of a Wi-Fi Alliance (Miracast), the receiver apparatus comprising:
a receiver unit for cooperation with a transmission apparatus according to the Wi-Fi Display Technical Specification of the Wi-Fi Alliance, in order to wirelessly receive a first Internet Protocol (IP) address identifying the transmission apparatus and to receive the MPEG-TS compatible data stream including the first IP address from the transmission apparatus, and comprising an output terminal for supplying the MPEG-TS compatible data stream, wherein the receiver apparatus is further adapted to wirelessly receive a second address from the transmission apparatus, the second address identifying an external signal source, wherein the receiver apparatus is provided with:
a first unit for establishing a Wi-Fi Peer-to-Peer connection with the transmission apparatus,
a second unit for carrying out a Session Setup, the second unit being adapted to receive the first IP address, the second unit further being adapted to receive the second address so as to enable the receiver apparatus to receive an external IP data stream from the external signal source, the receiver apparatus further comprising a second output terminal for supplying the external IP data stream, or a decoded version thereof,
an IP extraction unit,
a Universal Datagram Protocol (UDP) extraction unit and a Real Time Protocol (RTP) extraction unit,
wherein the receiver apparatus further comprises at least one output arrangement comprising a switching arrangement, the at least one output arrangement being coupled between either the receiver unit and the IP extraction unit, or between two extraction units, or between the RTP extraction unit and the output terminal, an input of the switching arrangement being coupled to an output of the receiver unit or to an output of an extraction unit, a first output being coupled to an input of a particular extraction unit, or to the output terminal, and a second output being coupled to the second output terminal, and
wherein:
the switching arrangement is controlled by a switching signal derived from a composite control signal received from the transmission apparatus,
the composite control signal includes an indication signal indicating a type of transmission signal received by the receiver apparatus, the type of transmission signal including a first type corresponding to the MPEG-TS compatible data stream or a second type corresponding to the external IP data stream, the switching signal controlling a switch position of the switching arrangement, and
when the external IP data stream is specified for transmitting to the receiver apparatus, the composite control signal further includes an identification signal indicating a format for transmitting the external IP data stream.

2. The receiver apparatus of claim 1, wherein the input of the switching arrangement is coupled to an output of the IP extraction unit, the first output is coupled to an input of the UDP extraction unit, and the second output is coupled to the second output terminal.

3. The receiver apparatus of claim 2, wherein the switching arrangement further comprises:
a third output coupled to a first input of a second switching arrangement,
a second input of the second switching arrangement coupled to an output of the RTP extraction unit, and
an output of the second switching arrangement coupled to an input of an MPEG-TS decoding unit.

4. The receiver apparatus of claim 1, wherein the input of the switching arrangement is coupled to an output of the UDP extraction unit, the first output is coupled to an input of the RTP extraction unit, and the second output is coupled to the second output terminal.

5. The receiver apparatus of claim 1, wherein the input of the switching arrangement is coupled to an output of the RTP extraction unit, the first output is coupled to an input of an MPEG-TS decoding unit, and the second output is coupled to the second output terminal.

6. The receiver apparatus of claim 1 further comprising an input arrangement comprising a further switching arrangement, a first input of the further switching arrangement is coupled to an output of the receiver unit, an output is coupled to an input of a IP extraction unit, and a second input is coupled to an input terminal.

* * * * *